(12) United States Patent
Wambsganss (10) Patent No.: US 9,042,125 B1
(45) Date of Patent: May 26, 2015

(54) SERIES RESONANT POWER CONVERTER SYSTEM AND METHOD WITH IMPROVED EFFICIENCY

(71) Applicant: Warren J. Wambsganss, Van Horne, IA (US)

(72) Inventor: Warren J. Wambsganss, Van Horne, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 162 days.

(21) Appl. No.: 13/838,000

(22) Filed: Mar. 15, 2013

(51) Int. Cl.
*H02M 3/335* (2006.01)

(52) U.S. Cl.
CPC .................................. *H02M 3/33507* (2013.01)

(58) Field of Classification Search
USPC .......... 363/15, 16, 17, 21.01, 131, 132, 21.02
See application file for complete search history.

(56) References Cited

U.S. PATENT DOCUMENTS

| | | | |
|---|---|---|---|
| 2002/0191429 A1* | 12/2002 | Nadd et al. ..................... | 363/132 |
| 2005/0281061 A1* | 12/2005 | Radecker et al. ........... | 363/21.02 |
| 2008/0303289 A1* | 12/2008 | Holliday ....................... | 290/4 R |
| 2009/0206606 A1* | 8/2009 | Jorgensen et al. ............... | 290/44 |
| 2010/0135049 A1* | 6/2010 | Radecker et al. ........... | 363/21.03 |
| 2011/0080756 A1* | 4/2011 | Kern ............................... | 363/17 |
| 2011/0254379 A1* | 10/2011 | Madawala ..................... | 307/104 |
| 2012/0098346 A1* | 4/2012 | Garrity et al. ................... | 307/82 |
| 2013/0188397 A1* | 7/2013 | Wu et al. ......................... | 363/17 |

OTHER PUBLICATIONS

Chakraborty, C., "Performance, Design and Control of a Series-Parallel (CL2-Type) Resonant DC/DC Converter", IEEE Proceedings Online No. 20020369, Sep. 2002, 9 pages.
Matsuura, K., "Power-Density Development of a 5MHz-Switching DC-DC Converter", IEEE, 2012, 7 pages.
Pinheiro, H., "Self-Sustained Oscillating Resonant Converters Operating Above the Resonant Frequency", IEEE Transactions on Power Electronics, vol. 14, No. 5, Sep. 1999, 13 pages.
Sosa, J., "Analysis, Design and Practical Evaluation of an Input-Output Linearization Controller for the CLL-T DC-DC Resonant Converter", IEEE, 2006, 6 pages.
Sosa, J., "Sliding-Mode Input-Output Linearization Controller for the DC/DC ZVS CLL-T Resonant Controller", IEEE Transactions on Industrial Electronics, vol. 59, No. 3, Mar. 2012, 11 pages.
Texas Instruments, "CD74HC7046A, CD74HCT74046A Phase-Locked Loop With VCO and Lock Detector", Feb. 1998—Revised Oct. 2003, 29 pages.
Youssef, M., "Analysis and Design of a Novel LLC 48V Resonant Self-Oscillating Voltage Regulator Module", IEEE, 2007, 7 pages.

* cited by examiner

*Primary Examiner* — Adolf Berhane
(74) *Attorney, Agent, or Firm* — Angel N. Gerdzhikov; Donna P. Suchy; Daniel M. Barbieri (57) ABSTRACT

A series resonant power converter includes a power stage comprising a switching circuit operating at least a resonant frequency. To achieve soft switching and provide current at a voltage through an inductive element. The power converter can also include a control circuit for controlling a phase angle of the current, for controlling a duty cycle of the switching circuit.

20 Claims, 5 Drawing Sheets

SERIES RESONANT POWER CONVERTER SYSTEM AND METHOD WITH IMPROVED EFFICIENCY

FIELD

The present disclosure relates generally to power converter circuits and methods of converting power.

BACKGROUND

Series resonant converters (SRCs), such as LLC converters, are utilized in various power source applications. Power converters can be used in computing cabinets, displays, audio equipment, lighting, communication equipment, power supplies, etc. The LLC topology of the LLC converter can provide high efficiency and high power density but can be difficult to control due to a highly-linear power stage response and the inability to regulate at light or no load. Further, conventional LLC converters rely upon self-oscillating integrator circuits which are difficult to implement when the switching frequency is high (in the MHz range). Further, the magnetic structure in conventional LLC converters does not have a high Q, very repeatable flux leakage path for supporting power stage resonance.

Therefore, there is a need for a power converter optimized for high frequency operation. Further still, there is a need for a control scheme for series resonant converters, such as, LLC converters, that adequately regulate output at light or no load conditions and/or adequately controls the power switching stage. Yet further, there is a need for a higher efficiency power converter. Yet further still, there is a need for a magnetic structure with a high Q, very repeatable flux leakage path for supporting power stage resonance in a power converter. Still further, there is a need for a low cost, efficient, small series resonance power converter, such as an LLC converter.

SUMMARY

One exemplary embodiment relates to a series resonant power converter. The series resonant power converter includes a power stage comprised of a switching circuit operating at at least a resonant frequency to achieve soft switching and providing a current at a voltage through an inductive element. The series resonant power converter also includes a control circuit for controlling the phase of the current with respect to the phase of the voltage. The phase of the current with respect to the phase of the voltage is controlled to be between zero and ninety degrees. The control circuit also controls a duty cycle of the switching circuit so that the duty cycle is reduced to prevent high switching losses from causing excessive temperature rise.

Another exemplary embodiment relates to a method of converting voltages. The method includes providing a current through a transformer in a power stage at a resonant frequency of the power stage, controlling the phase of the current, and controlling a duty cycle of the switching circuit. The phase of the current is controlled to have a lagging power factor. The duty cycle is controlled so that a gain relationship to the frequency is relatively linear between maximum and minimum operating frequency.

Another embodiment relates to a power supply. The power supply includes a transformer comprising stamped wirings, a power stage, a phase circuit for controlling a phase angle of current associated with the transformer, and a duty cycle circuit. The duty cycle of the current is reduced to prevent high switching losses from causing excessive temperature rise by the duty cycle circuit.

BRIEF DESCRIPTION OF THE DRAWINGS

Exemplary embodiments will be described with reference to the accompanying drawings, wherein numerals denote like elements, and.

DETAILED DESCRIPTION

According to one embodiment, a power supply or other power application can use a power converter. The power converter can be configured for the reception and provision of alternating current (AC) or direct current (DC) power at various voltages (Vs). In one embodiment, a power converter is embodied as a power converter for use in aircraft 11. Aircraft power supplies can be used to supply power to a variety of equipment, including but not limited to radios, computers, navigation equipment, flight controls, radar, sensors, entertainment equipment, displays, audio equipment, etc. Although aircraft applications are mentioned herein, the scope of the invention is not limited to aircraft power supplies, aircraft applications or uses in aircraft applications. The scope of the invention includes all power applications where a power converter is used.

Figure 1:
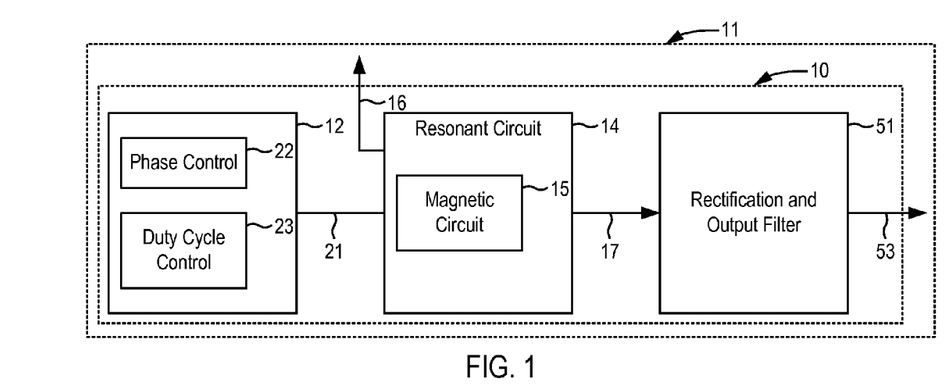
FIG. 1 is a general block diagram of a power supply in accordance with an exemplary embodiment.

With reference to FIG. 1, a power supply 10 includes a control circuit 12, a power stage or resonant circuit 14, and a rectification and output filter 51. Resonant circuit 14 can be embodied as a series resonant circuit, an LLC resonant circuit, or other converter. In one embodiment, circuit 14 includes a magnetic circuit 15. Magnetic circuit 15 can be an inductive element, such as, a transformer, in one embodiment. Magnetic circuit 15 can be a transformer that is configured to have a tightly controlled, high-Q series inductance with no or low interconnect parasitics and yet have a very small size in one embodiment.

Control circuit 12 provides control signals via control line 21 so that resonant circuit 14 converts power provided at power input 16 to power having different parameters at a power output 17 using switching and magnetic circuit 15. Control circuit 12 operates switches within resonant circuit 18 at resonant frequency (e.g., the multiple MHz range, 1-5

MHz, etc.) via control line 20 to appropriately drive current through magnetic circuit 15 to effect the power conversion. In one embodiment, the power at power input 16 can be a DC power of 24 VDC-28 VDC, and the power provided by rectification and output filter 51 at output 53 can be 200 W, regulated power line isolated 12 VDC power. Alternative power input and output parameters can be utilized according to various application requirements.

Resonant circuit 14 includes very low on resistance switching circuits (e.g., silicon FETs with fast body diodes, or GAN-based HFET devices for power conversion that do not contain a body diode) in one embodiment. Such devices allow reduced capacitive switching losses and high frequency, high power density power conversion in resonant topologies according to one embodiment, thereby providing an efficient power supply 10. Rectification and output filter 51 can also include very low on resistant switching devices. Alternatively, other types of switching devices can be utilized.

Control circuit 12 controls a switching in resonant circuit 14 to operate in a soft switching mode in one embodiment. Control circuit 12 includes a duty cycle control circuit 23 and a phase control circuit 22 in one embodiment. In one embodiment, phase control circuit 22 ensures optimal control of resonant circuit 18 by keeping the power stage in a phase range of 0 to 90 degrees (e.g., phase of current versus phase of voltage) despite variations in current values. Further, duty cycle control circuit 23 reduces the duty cycle when control outside of the nominal operating range is required. A reduction in duty cycle is performed in a way that maintains soft switching and prevents high switching losses, thereby preventing excessive temperature rise. Although zero current switching can be lost at certain performance levels, zero voltage switching is maintained in one embodiment. In such an embodiment, high voltage transients occur only for very short time so that losses from non-zero current switching do not present a problem. If reduced duty cycle is required because of very small load on the output, loss of zero current switching is not a concern because of low level of loading, and therefore, the current in resonant circuit 14 is relatively low.

Figure 2:
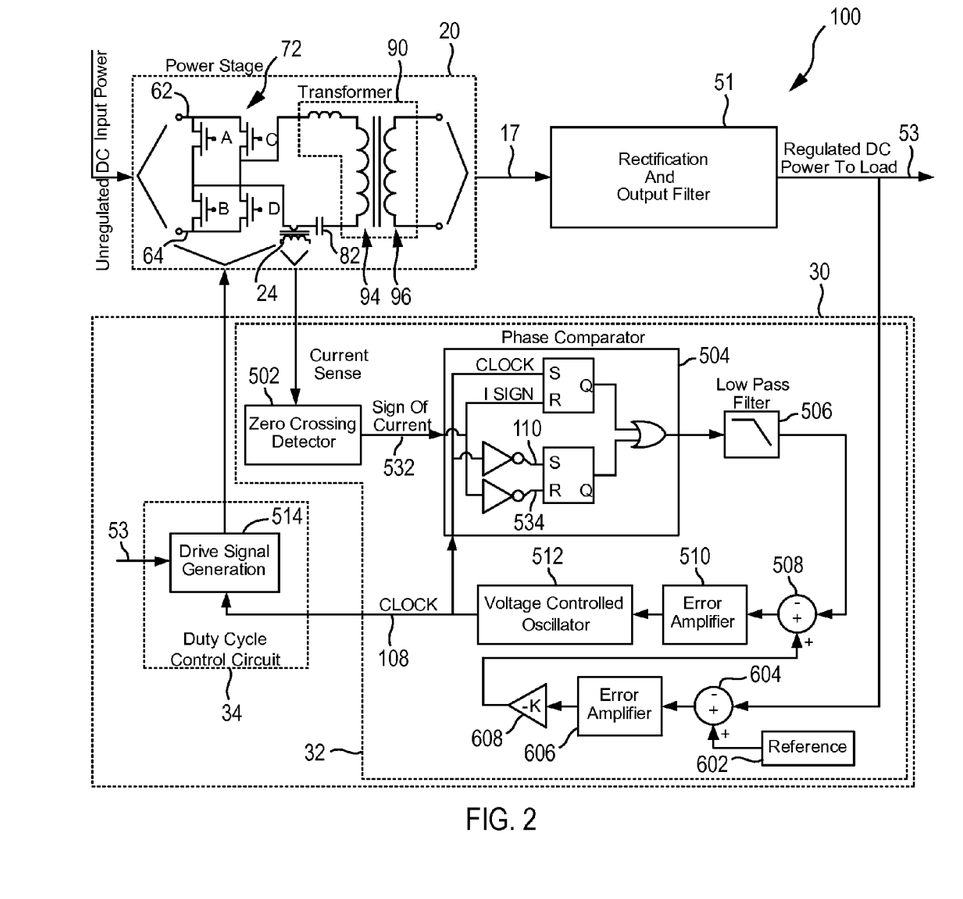
FIG. 2 is a more detailed general block diagram of a power supply including a power stage and a control circuit in accordance with another exemplary embodiment.

With reference to FIG. 2, a power supply 100 similar to power supply 10 includes a power stage 20, a control circuit 30, and a rectification and output filter 51 in accordance with another embodiment. Control circuit 30 includes phase control circuit 32 and duty cycle control circuit 34. Power supply 100 can operate similar to power supply 10 in one embodiment.

Power stage 20 includes a switching circuit 72 coupled between an input 62 and an input 64, a transformer 90, an output 17, a current sense circuit 24 and a capacitor 82. Control circuit 30 is coupled to sense the voltage at output 53 for phase control circuit 32 and duty cycle control circuit 34.

Phase control circuit 32 includes a zero crossing detector 502, a phase comparator circuit 504, a low pass filter 506, a summer 508, an error amplifier 510, a voltage controlled oscillator 512, a reference circuit 602, a summer 604, an error amplifier 606, and a gain circuit 608. Duty cycle control circuit 34 includes a drive signal generation circuit 214 for providing drive signals to switching circuit 72 in response to a CLOCK signal provided by oscillator 512 at node 108. Drive signal generation circuit 514 can also provide drive signals to a switching circuit in rectification and output filter 51 in one embodiment.

A sense signal from current sense circuit 24 is provided through zero crossing detector 502 to provide a SIGN signal representing the polarity of the current provided through transformer 90. The SIGN signal is a high or low signal generated by detector 502 embodied as a high speed CMOS comparator coupled to current sense circuit 24 (e.g., a current transformer disposed around a conductor attached to capacitor 82) in one embodiment The SIGN signal and CLOCK signal provided by oscillator 512 is provided to phase comparator 504 in one embodiment. The CLOCK signal represents the polarity of the switches in switching circuit 72 and hence the polarity of the voltage across transformer 90 in one embodiment. The result of the comparison is low pass filtered by low pass filter circuit 506 and provided to summer 508 in one embodiment. Comparator 504 and duty cycle circuit 34 can use an inverted CLOCK signal at node 110 and an inverted SIGN signal at node 534 in one embodiment.

Summer 508 subtracts the signal from filter 506 from an error signal from gain circuit 608. Summer 604 subtracts the output voltage at output 53 or an error signal derived from the output voltage from a reference signal provided by reference circuit 604 and provides the difference to error amplifier 606. Error amplifier 606 provides its output to gain circuit 608 which provides the error signal to summer 508. Error amplifier 606 and summer 604 strive to keep the output voltage constant.

Summer 508 provides the difference between the signal from filter 506 and the error signal from gain circuit 608. Error amplifier 510 provides the amplified difference signal to voltage control oscillator 512 so that voltage control oscillator provides the CLOCK signal to drive signal generation circuit 514 of duty cycle control circuit 34 at the appropriate frequency.

Drive signal generation circuit 514 drives switching circuit 72 in accordance with the phase control provided by phase control circuit 32. Phase control circuit 32 controls the CLOCK signal so that when voltage and current in stage 20 are in phase, such as when the input voltage at inputs 62 and 64 is at a minimum and the loading at output 17 or output 53 is at a maximum, the output from comparator 504 is in a predominantly low state. When voltage and current in stage 20 are out of phase, the pulse train duty cycle from comparator 504 increases. The increased pulse train duty cycle is filtered by filter 506 and compared to a threshold via amplifier 606. Error amplifier 606 strives to keep the output voltage at output 53 constant. The combination oscillator 512, amplifier 510 and logic in comparator 504 form a phase locked loop for the CLOCK signal in one embodiment. The phase locked loop cannot demand a frequency below the resonant frequency in one embodiment.

Duty cycle control circuit 34 receives the CLOCK signal and adjusts the duty cycle of the drive signals provided by circuit 514 in accordance with the output voltage at output 53 or an associated error signal. Circuit 34 reduces the duty cycle in a way that maintains soft switching to prevent high switching losses in circuit 72.

Figure 3:
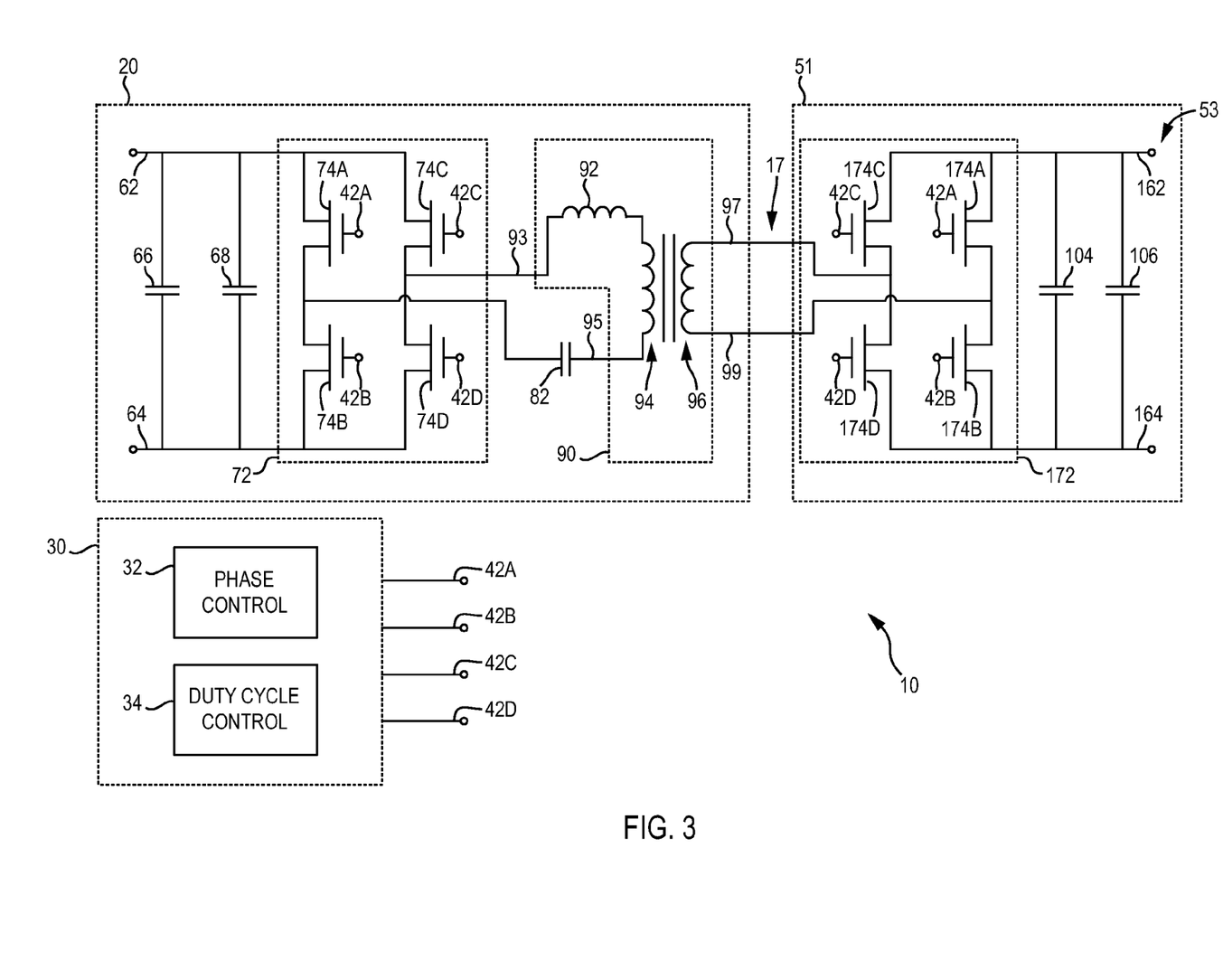
FIG. 3 is a schematic circuit diagram of the power stage for power supply illustrated in FIG. 1 according to another exemplary embodiment.

With reference to FIG. 3, power stage 20 includes switching circuit 72 and rectification and rectification and output filter 51 includes a switching circuit 172. A DC voltage signal can be provided at inputs 62 and 64. In one embodiment, power stage 20 is configured as an LLC power stage including transformer 90, and rectification and output filter 51 is configured as a full bridge rectifier.

Switching circuit 72 includes transistors 74A, 74B, 74C, and 74D, and switching circuit 172 includes transistors 174A, 174B, 174C, and 174D. Transistors 74A and 174A receive a drive signal on a control line 42A at their gates, transistors 74B and 174B receive a drive signal on a control line 42B at their gates, transistors 74C and 174C receive a drive signal on a control line 42C at their gates and transistors 74D and 174D receive a drive signal on a control line 42D at their gates. The node between transistors 74C and 74D is coupled to a first primary input 93 of a primary 94 of transformer 92, and a second primary input 95 of primary 94 is coupled to a capacitor 82. Capacitor 82 is coupled to the node between transistors 74A and 74B. The drive or control signals for circuit 72 can be distinct from the drive or control signals for circuit 172.

In one embodiment, a node between transistors 174C and 174D is coupled to a first output 97 of secondary 96 of transformer 90 and a node between transistor 174A and transistor 174B is connected to an output 99 of secondary 96. Although a full bridge conversion LLC converter topology is shown in FIG. 3, other resonant converter topologies are possible without departing from the scope of the invention. Transistors 74A-D and 174A-D can be silicon FETs with fast body diodes and very low on resistance, and GaN based HFET devices that do not contain a body diode, or other switching device. Alternative transistor and switches can also be utilized.

Transformer 90 includes a series inductive leakage path 92 at input 93. Capacitors 66 and 68 are provided between inputs 62 and 64, and capacitors 104 and 106 are provided between outputs 162 and 164. In one embodiment, to provide power stage resonance necessary for phase/frequency-based modulation, transformer 90 includes series inductive leakage path 92 and capacitor 82. Path 92 can be an external series inductor or be provided by a leakage flux path in transformer 90.

Control circuit 30 controls switching circuits 72 and 172 at or above a resonant frequency to ensure soft switching. Operating at a resonant frequency provides a power stage current through primary 94 that lags the drive voltage and thus is a lagging power factor. The inductive nature of power stage 20 when operated above resonance allows full commutation of the switch voltage in circuits 72 and 172 during dead time so that transistors 74A-D and 174A-D are turned on with little or no voltage across them. If circuit 20 is operated below resonant frequency, soft switching is lost, thereby resulting higher switching losses and possible failure of hardware. Accordingly, control circuit 30 provides control or drive signals on lines 42A-D at such that circuits 172 and 174 will not be operated at a frequency below the resonant frequency in one embodiment. In one embodiment, operation of stage 20 at frequencies not below the resonant frequency is not achieved by directly controlling operating frequency. Instead, operation of stage 20 at frequencies not below the resonant frequency is achieved by controlling the phase angle of the power stage current using phase control circuit 32 in one embodiment.

Conventional systems have utilized an integrator based circuit to control phase angle. However, the integrator is reset after each switch cycle which is impractical when operating in the MHz range. In another conventional system, a phase lock loop (PLL) circuit can be utilized. However, such conventional systems do not absolutely constrain the power system to a power factor and may latch the converter operation to the leading range due to transient conditions or component tolerance, thereby creating loss of control and component failure. Accordingly, control circuit 32 includes phase control circuit 32 which advantageously limits operational current to a lagging power factor or to a frequency above the resonant frequency in one embodiment.

Duty cycle control circuit 34 operates to maintain regulation during no load or very light load conditions. At no load, the voltage at output 162 and 164 will rise uncontrollably with conventional control schemes. A similar problem can be experienced when the input voltage at input 62 and 64 undergoes a high voltage transient with any level of output loading. Duty cycle control circuit 34 controls the input current to transformer 90 when above the maximum nominal operating range in order to maintain control of stage 20.

Figure 4:
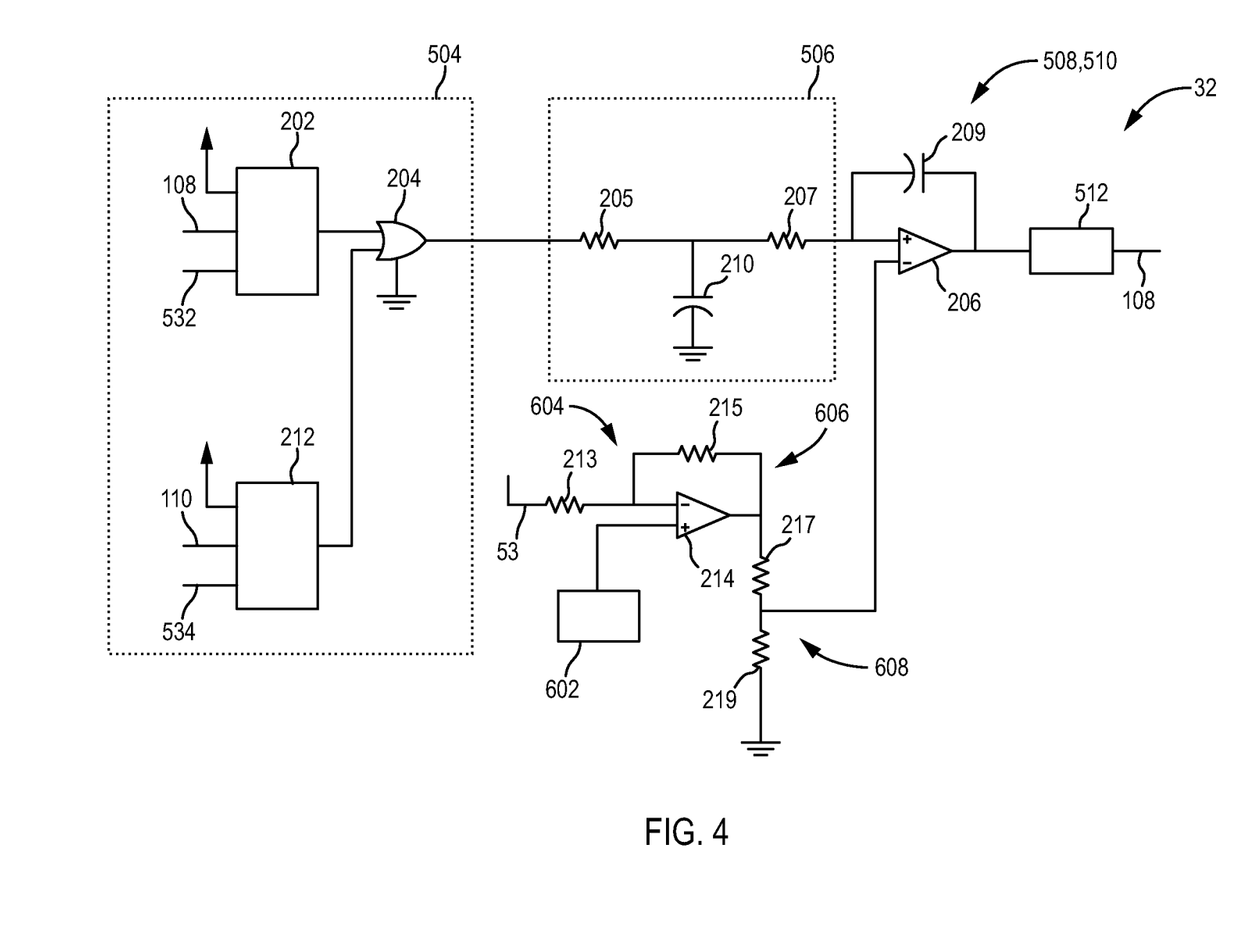
FIG. 4 is an schematic electrical circuit diagram of a phase control circuit for use in control circuit of the power supply illustrated in FIG. 2 according to another exemplary embodiment.

With reference to FIG. 4, phase control circuit 32 includes a flip flop 202, an OR gate 204, a resistor 205, a resistor 207, a capacitor 209, an operational amplifier 206, voltage control oscillator (VCO) 512, a capacitor 209, capacitor 210, a flip flop 212, a resistor 213, a resistor 215, a resistor 217, a resistor 219, and an operational amplifier 214 in one embodiment. Flip flop 202 is a D flip flop receiving the CLOCK signal (e.g., at node 108) at its clock input and the SIGN signal (e.g., at node 532) at its reset input. Flip flop 212 is a D flip flop receiving the inverted CLOCK signal (e.g., at node 110) at its clock input and the inverted SIGN signal (e.g., at node 534) at its reset input. The SIGN signal represents the phase of current in stage 20, and the CLOCK signal represents the phase of the voltage across power stage 20. The outputs of flip flops 202 and 212 are provided to OR gate 204. The output of OR gate is connected to amplifier 206 configured as an integrator (via capacitor 209) through low pass filter 506 comprised of resistors 205 and 207 and capacitor 210.

When the current and voltage in stage 20 are in phase, such as when the input voltage is minimum and the output voltage is maximum for supply 100, the output of OR gate 204 is in a low-state because the outputs of flip flops 202 and 212 remain low in this condition due to the signals at the reset inputs of flip flops 202 and 212. When the voltage and current in circuit 20 are out of phase, OR gate 204 provides a pulse trained duty cycle. The duty cycle of the signal at the output of OR gate 204 is related to the amount the voltage and current are out of phase (e.g., the amount the current lags the voltage) in one embodiment. When the phase difference is larger, the duty cycle is larger in one embodiment. The pulse train from OR gate 204 is filtered by filter 506 and compared to a reference voltage at the junction of resistors 217 and 219 by amplifier 206. The reference voltage is provided to the negative input of amplifier 206, and the filtered signal from filter 506 is provided to the positive input of amplifier 206. The output of amplifier 206 controls oscillator 512 which provides the CLOCK signal at output 108. When filter 506 provides a higher signal, amplifier 206 increases the frequency provided by oscillator 512. When filter 506 provides a lower signal, amplifier 206 lowers the frequency provided by oscillator 512.

The reference voltage for amplifier 206 is provided by amplifier 214. When the voltage at output 53 decreases, the reference voltage at the junction of resistors 217 and 219 by amplifier 214 is decreased in one embodiment. When the voltage at output 53 increases, the reference voltage at the junction of resistors 217 and 219 by amplifier 214 is increased in one embodiment. Amplifier 214 receives a fixed threshold voltage at its positive input and a voltage error associated with output 53 at its negative input in one embodiment. Accordingly, when the voltage at output 53 is higher, amplifier 206 increases the frequency provided by oscillator 512, and when voltage at output 53 is lower, amplifier 206 decreases the frequency provided by oscillator 512 in one embodiment.

In one embodiment, the operation of amplifiers 206 and 214 and associated circuitry prevent the phase control loop from demanding a frequency below the point of resonance. This control structure allows optimal control of stage 20 by absolutely keeping the power stage phase between zero and ninety degrees inclusive, despite variation of component values in accordance with an exemplary embodiment.

Figure 5:
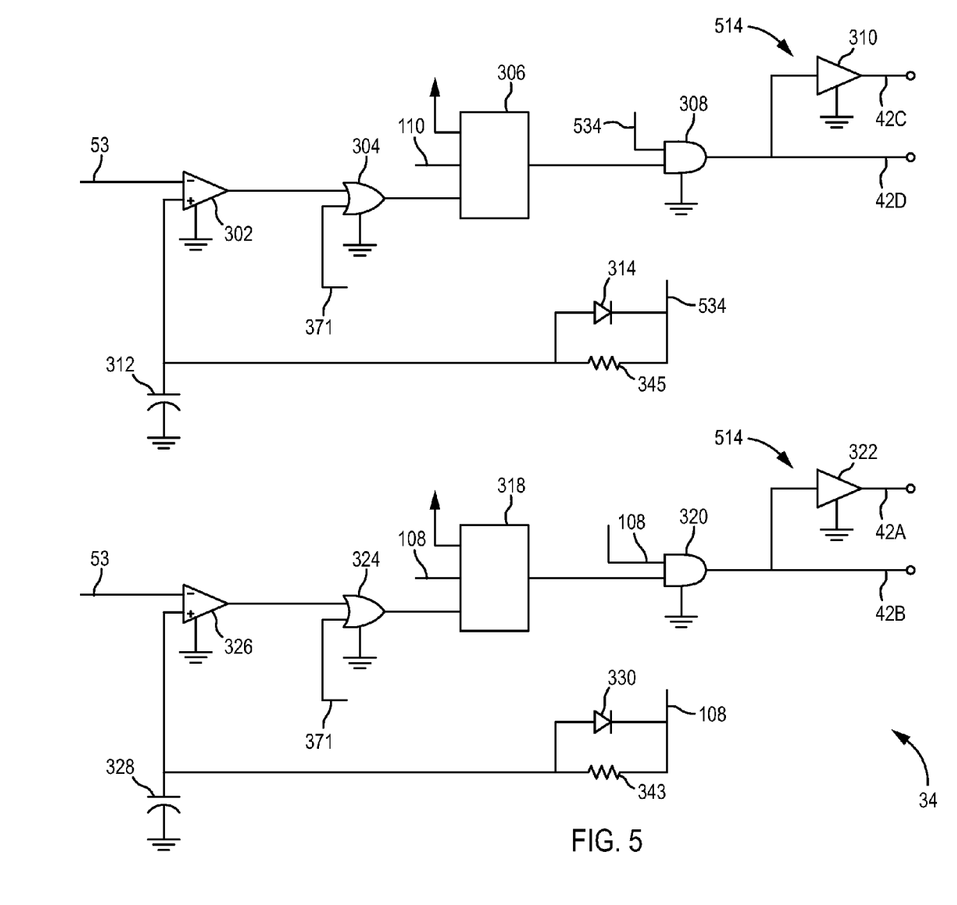
FIG. 5 is an schematic electrical circuit diagram of a duty cycle control circuit for use in control circuit of the power supply illustrated in FIG. 2 according to yet another exemplary embodiment.

With reference to FIG. 5, duty cycle control circuit 34 receives the voltage at output 53 or a voltage error associated with output 53 and the CLOCK signal (e.g., node 108) and inverted CLOCK signal (e.g., node 110) from phase control circuit 32. Duty cycle control circuit includes an operational amplifier 302, an OR gate 304, a flip flop 306, an AND gate 308, and an inverter 310. Circuit 34 can also include an operational amplifier 326, a diode 314, a resister 345, a capacitor 312, an amplifier 326, an OR gate 324, a flip flop 318, an AND gate 320, an inverter 322, a diode 330, a resister 343 and a capacitor 328.

Amplifiers 326 and 302 are configured as comparators having a negative input coupled to a voltage error associated with output 53 and a positive input coupled to receive a ramp signal. The ramp signal for amplifier 326 is provided by diode 330, capacitor 328 and resistor 343 driven by the CLOCK signal. The ramp signal for amplifier 326 is provided by diode 314, capacitor 312, and resistor 345 driven by the inverted CLOCK signal.

Flip flops 306 and 318 are configured a D flip flops with a reset input coupled to respective OR gates 304 and 324. A first input of OR gate 304 receives the output of amplifier 302, and a first input of OR gate 324 receives the output of amplifier 326. A second input of OR gate 304 and a second input of OR gate 324 receives an ILIMIT signal representing a current limiting condition. The ILIMIT signal can be provided by a high speed comparator at node 371. A current transformer can provide an indication of the current at output 53. The ILIMIT signal can be used for current limiting and protection of power stage 20. When the ILIMIT signal is above a threshold, the CLOCK signal and inverted CLOCK signal are effectively disabled by respective OR gates 304 and 324 which have outputs coupled to respective reset inputs of flip flops 306 and 318.

A clock input of flip flop 318 receives the CLOCK signal at node 108, and a clock input of flip flop 306 receives the inverted CLOCK signal at node 110. Control line 42A is coupled to an output of inverter 322, and control line 42B is coupled to an output of AND gate 320. Control line 42D is coupled to the output of AND gate 308, and control line 42C is coupled to inverter 310. AND gate 308 is coupled to receive the output of flip flop 306 and the inverted CLOCK signal at signal. AND gate 320 is coupled to receive the CLOCK signal and an output of flip flop 318.

Amplifiers 302 and 326 are configured as comparators and compare the ramp signals from respective capacitors 312 and 328 to the voltage error associated with output 53. The signal from amplifiers 302 and 326 are provided to respective OR gates 304 and 324 which control the duty cycle of the CLOCK and inverted CLOCK signal through the operation of respective flip flops 318 and 306. When the voltage at output 53 is higher, the duty cycle of the 42B signal and the 42D signal is higher.

During nominal operation, transistors 74A-D have zero voltage switching (ZVS) and zero current switching (ZCS). In one embodiment, circuit 34 achieves duty cycle reduction by providing the ramp signals using resistors 343 and 345, diodes 314 and 333, and capacitors 312 and 328. When error voltage is low, amplifiers 326 and 302 terminate the current switch early for transistors 74B and 74D and immediately turn on transistors 74A and 74C by operation of inverters 310 and 322, thereby reducing the duty cycle of the differential voltage across primary 94 of transformer 90 but still maintaining zero voltage switching of transistors 74A-D. Zero current switching is lost but zero voltage switching is still maintained which represents the majority of the switching loss. High voltage transients can occur for a very short amount of time so loss from zero current switching does not represent a significant problem. If supply 10 or 100 lapses into reduced duty cycle mode because of a very small load on the output, the loss of zero current switching is not a concern because the loading and current in stage 20 is low.

Figure 7:
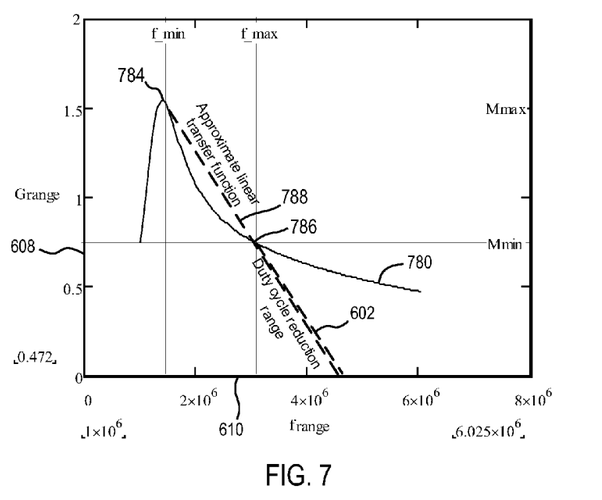
FIG. 7 is a graph of gain versus frequency for a conventional power supply and the power supplies illustrated in FIGS. 1 and 2 according to yet still another exemplary embodiment.

Certain current LLC converters cannot maintain regulation at low load or very light load conditions. At no load, the output voltage rises uncontrollably. A similar problem is experienced when the input voltage undergoes a high transient voltage with any level of output. With reference to FIG. 7, the Y-axis 608 is gain and the X-axis 610 is frequency. Gain can be decreased by further increasing switching frequency as shown by response 780 of a conventional supply; however, an increase in switching frequency is impractical as it would exceed the maximum operating frequency range of the conventional supply. The nominal operating range shown in FIG. 7 is between maximum loading and minimum input voltage represented by the point F-min 784 and minimum loading and maximum input voltage represented by point F-max 786. Accordingly, control outside of normal operating range is provided for sources 10 and 100. In one embodiment, duty cycle control of switch circuit 72 is achieved by circuit 34 which reduces duty cycle when above the maximum operating range. This has the added advantage of making the gain of sources 10 and 1000 more linear as represented by a dashed line 788 in FIG. 7. The reduction in duty cycles is preferably performed in a way that maintains soft switching of supply 10 or 100 to prevent high switching losses causing excess temperature rise.

Figure 6A:
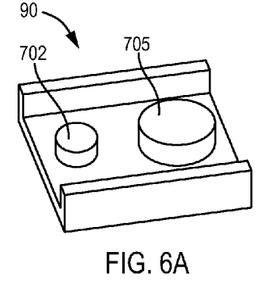
FIGS. 6a-f are schematic perspective view assembly drawings of a transformer for use in the power supply illustrated in FIG. 2 according to still another exemplary embodiment.
Figure 6B:
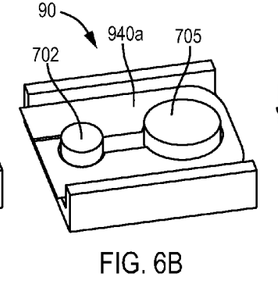
Figure 6C:
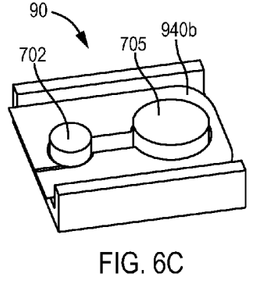
Figure 6D:
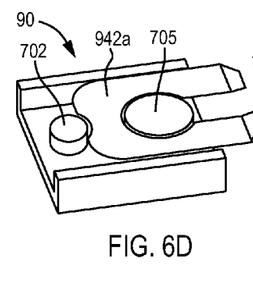
Figures 6E, 6F:
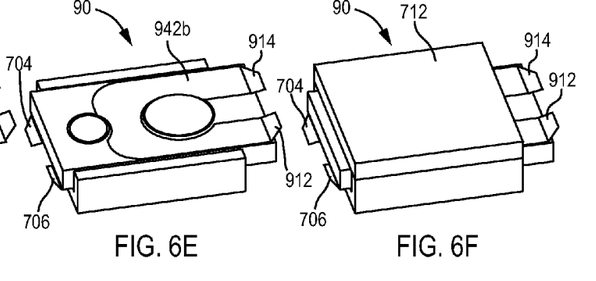

With reference to FIGS. 6a-f, transformer 90 is assembled and shown as complete in FIG. 6f with a cover 712. A turns ratio for transformer 90 is 2:1 with primary terminals 704 and 706 on a left-hand side of FIGS. 6e and 6f and secondary terminals 912 and 914 on a right-hand side of FIGS. 6e and 6f. Transformer 90 is preferably a printed wiring board style design having two single primary turns as stamped windings 940a and 940b (FIGS. 6b and 6c) connected in series and two single secondary turns as stamped windings 942a and 942b (FIGS. 6d and 6e) connected in parallel. Transformer 90 can be utilized in 24 VDC or 28 VDC power converter. A large center post 705 (FIG. 6a) provides the transformer core and a flux leakage path is provided by a smaller center post 702.

In one exemplary embodiment, supplies 10 and 100 can provide two-hundred watts of regulated power, as power line isolated 12 VDC power with a total transformer size by one inch by one inch by 0.36 inches or less.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. The specific circuits shown are exemplary only and various circuit configurations could be used to provide the power supplies described herein without departing from the scope of the invention.

The various illustrative logical blocks, modules, and circuits described in connection with the embodiments disclosed herein may be implemented or performed with a general purpose components, a digital signal or general purpose processor (DSP), an application specific integrated circuit (ASIC), a field programmable gate array (FPGA) or other programmable logic device, discrete gate or transistor logic, discrete hardware components, or any combination thereof designed to perform the functions described herein.

In one or more exemplary embodiments, the functions described may be implemented in hardware, software, firmware, or any combination thereof. If implemented in software, the functions may be stored on or transmitted over as one or more instructions or code on a computer-readable medium. A nontransitory storage media may be any available media that can be accessed by a computer.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed:

1. A series resonant power converter, comprising:
   a power stage comprising a switching circuit operating at at least a resonant frequency to achieve soft switching and provide current at a voltage through an inductive element; and
   a control circuit for controlling a phase angle of the current, the phase angle of the current with respect to the voltage being controlled to be between 0 and 90 degrees and for controlling a duty cycle of the switching circuit, the duty cycle being reduced to prevent high switching losses from causing excessive temperature rise.

2. The series resonant power converter of claim 1, wherein the power stage is comprised of a transformer disposed between a first set of four switch devices and a second set of four switch devices.

3. The series resonant power converter of claim 2, wherein the transformer is a printed wiring board transformer having a first center post and a second center post, the second center post providing a flux leakage path.

4. The series resonant power converter of claim 1, wherein the switching circuit is a full bridge switching circuit.

5. The series resonant power converter of claim 1, wherein the control circuit provides a clock signal using a phase locked loop, wherein the clock signal is generated using a polarity signal associated with the current.

6. The series resonant power converter 1, wherein polarity signal is provided by at least one current transformer in the power stage.

7. The series resonant power converter of claim 1, wherein the resonant frequency is in the multiple Megahertz range.

8. The series resonant power converter of claim 1, wherein the transformer includes a plurality of primary turns coupled in series and a plurality of secondary turns coupled in series or parallel, wherein the secondary and primary turns are metal stampings.

9. The series resonant power converter of claim 1, wherein the series resonant power converter is an LLC power converter providing a 24-28 VDC input and a 12 VDC output.

10. The series resonant power converter 1, wherein transformer has dimensions of less than 1"×1"×0.36".

11. A method of converting voltages, comprising:
    providing current through a transformer in a power stage at a resonant frequency of the power stage;
    controlling a phase angle of the current, the phase angle of the current being controlled to have a lagging power factor; and
    controlling a duty cycle of the switching circuit so that a gain relationship to frequency is relatively linear between maximum and minimum operating frequency.

12. The method of claim 11, wherein the duty cycle is reduced to prevent high switching losses from causing excessive temperature rise.

13. The method of claim 11, wherein the power stage is an LLC power stage.

14. The method of claim 13, wherein the power stage includes two switching circuits, the transformer being coupled between the two switching circuits.

15. The method of claim 11, wherein a comparator is used for current limiting, the comparator receiving a signal form a current transformer.

16. A power supply, comprising:
    a transformer comprising stamped windings;
    a power stage;
    a phase circuit for controlling a phase angle of current associated with the transformer; and
    a duty cycle circuit, the duty cycle of the current being reduced to prevent high switching losses from causing excessive temperature rise.

17. The power supply of claim 16, wherein the transformer is provided on a host board.

18. The power supply of claim 16, wherein the power stage switches at zero voltage switching and zero current switching during nominal operation.

19. The power supply of claim 16, wherein the power supply is a part of an aviation system.

20. The power supply of claim 16, wherein the wherein the transformer includes a first center post and a second center post, the first center post being smaller than the second center post and providing a flux leakage path.

* * * * *